United States Patent [19]

Heindl et al.

[11] Patent Number: 4,778,370

[45] Date of Patent: Oct. 18, 1988

[54] CHANGING DEVICE FOR THE SCREW CYLINDER OF AN INJECTION MOLDING MACHINE

[75] Inventors: Friedrich Heindl; Rudolf Reiser, both of Baden; Harald Bleier, Neustadt, all of Austria

[73] Assignee: Battenfeld Kunststoffmaschinen Ges. m.b.H.

[21] Appl. No.: 117,231

[22] Filed: Nov. 4, 1987

[30] Foreign Application Priority Data

Nov. 4, 1986 [DE] Fed. Rep. of Germany ....... 3637569

[51] Int. Cl.$^4$ .................... B29C 45/03; B29C 45/74
[52] U.S. Cl. .................................... 425/190; 425/550
[58] Field of Search .............. 425/190, 192 R, 547, 425/550, 574

[56] References Cited

U.S. PATENT DOCUMENTS

| | | | |
|---|---|---|---|
| 3,822,975 | 7/1974 | Hehl | 425/550 |
| 3,880,560 | 4/1975 | Takahashi | 425/192 |
| 4,430,059 | 2/1984 | Bielfeldt | 425/150 |
| 4,680,002 | 7/1987 | Hehl | 425/192 R |
| 4,704,078 | 11/1987 | Hehl | 425/192 |
| 4,708,622 | 11/1987 | Hehl | 425/192 R |

*Primary Examiner*—Willard E. Hoag

*Attorney, Agent, or Firm*—Toren, McGeady & Associates

[57] ABSTRACT

A changing device for the screw cylinder of an injection molding machine. The screw of the screw cylinder is in releasable coupling connection with a drive unit of the machine. For releasing and uncoupling the coupling connection, the screw cylinder including screw can be displaced relative to the injection molding machine essentially transversely of the longitudinal direction of the screw cylinder. Two hydraulic cylinders are arranged spaced apart next to each other symmetrically and parallel to the longitudinal center plane of the injection molding machine. The two cylinders are connected to each other by means of a transverse member. A free space extending forwardly from the drive unit is defined by the two hydraulic cylinders and the transverse members. The free space forms an alignment seat which is open towards the front and towards the back and a longitudinal side. In the coupled position, the screw cylinder is fixable and lockable to the drive unit in this alignment seat. The free space forming the alignment seat of the changing device is open toward the bottom, so that the transverse member which connects the hydraulic cylinders acts on the upper longitudinal side of the hydraulic cylinders.

19 Claims, 5 Drawing Sheets

CHANGING DEVICE FOR THE SCREW CYLINDER OF AN INJECTION MOLDING MACHINE

BACKGROUND OF THE INVENTION

1. Field of the Invention

The present invention relates to a changing device for the screw cylinder or extruder barrel of an injection molding machine. The screw of the screw cylinder is in releasable coupling connection with the drive unit of the machine. For releasing and uncoupling the coupling connection, the screw cylinder including screw can be displaced relative to the injection molding machine essentially transversely of the longitudinal direction of the screw cylinder. Two hydraulic cylinders are arranged spaced apart next to each other symmetrically and parallel to the longitudinal center plane of the injection molding machine. The two cylinders are connected to each other by means of a transverse member. A free space extending forwardly from the drive unit is defined by the two hydraulic cylinders and the transverse member. This free space forms an alignment seat which is open toward the front and the back and a longitudinal side. In the coupled position, the screw cylinder is fixable and/or lockable to the drive unit in this alignment seat.

2. Description of the Prior Art

In injection molding machines for processing thermoplastic materials, it is relatively frequently necessary to exchange the screw cylinder, particularly when the plastics material to be processed is changed and when the coloring agent is changed. The screw cylinder is usually disconnected for this purpose from the material feeding units of the injection molding machine and from the drive unit for the screw which drive unit is part of the machine. Subsequently, the screw cylinder is removed from the injection molding machine by using a lifting unit.

The operating steps and/or manipulations required for changing the screw cylinder are quite complicated and, therefore, require that the respective injection molding machine stands still for a relatively long time which leads to a loss of production.

It is, therefore, the primary object of the present invention to provide a changing device for the screw cylinder of an injection molding machine in which the assembly and disassembly operations to be carried out are substantially simplified and, thus, the periods of standstill of the injection molding machine are reduced.

SUMMARY OF THE INVENTION

In accordance with the present invention, the alignment seat of the changing device of the type described above is open toward the bottom, i.e., the transverse member which connects the hydraulic cylinders acts on the upper longitudinal side of the hydraulic cylinders.

In the changing device according to the present invention, the screw cylinders can be assembled and disassembled from below, i.e., the material feeding units can always remain in their predetermined positions at the injection molding machine and do not have to be removed during the exchange of the screw cylinders.

In addition, the changing device according to the present invention makes it possible to have the screw cylinder always accessible over its entire length along a longitudinal side without obstruction from the hydraulic cylinders. Accordingly, the necessary changing operations can be carried out quickly and without problems. Moreover, the screw cylinder is exactly aligned in its assembled position relative to the drive unit on the machine and to the material feeding units, so that a permanently trouble-free operation can be ensured.

In accordance with a preferred embodiment of the invention, the rearward end of the screw cylinder is surrounded by a cooling block which has a prismatic peripheral shape which is adjusted to the free space or alignment seat.

In this case, screw cylinder and cooling block can be considered a structural unit and, in the assembled state, ensure the correct cooperation of the screw cylinder with the drive unit on the machine.

In accordance with a particularly important further development of the changing device according to the present invention, the injection molding machine defines in its base frame an open space underneath the hydraulic cylinders and the screw cylinder. The free height of this open space corresponds at least to the greatest structural height of a screw cylinder combined with a cooling block. A lifting unit is mounted in the base frame for vertically moving each screw cylinder including cooling block between the open space and the free space or the alignment seat within the injection molding machine.

As a consequence, the screw cylinders can be exchanged fully automatically without requiring additional external auxiliary units because all movements necessary for an exchange cycle can be coordinated with each other and can then take place fully automatically after the changing procedure has been initiated, for example, by pressing a button.

For a fully automatic exchange of the screw cylinders, it is particularly helpful to provide a storage unit in the open space above the base frame. This storage unit has at least two storage positions arranged next to each other for supporting two screw cylinders including cooling blocks. These two storage positions can be moved alternatingly into the range of operation of the lifting unit and underneath the free space or alignment seat. A screw cylinder which is in the injection molding machine at a given time can initially be lowered into the free storage position of the storage unit. Subsequently, the storage unit is moved in such a way that the second storage position holding another screw cylinder is moved above the lifting unit and can then be moved by means of the lifting unit into the free space or the alignment seat between the two hydraulic cylinders.

In accordance with another feature of the present invention, the storage unit includes a longitudinal middle support member and two longitudinal side members and transverse pipes which connect the middle support member and the two side members at a predetermined distance with each other, wherein the transverse pipes are movably mounted by means of guide bushings on cross-beams supported by the base frame. The storage unit can be moved transversely in the base frame between two end positions by means of pressure medium cylinders.

By means of lateral support members, for example, rollers, the screw cylinders can be placed on the middle support member and one of the side members and can be moved in longitudinal direction on these members. The screw cylinders can be fixed in a predetermined longitudinal position relative to the middle support member and to the side members, so that the screw cylinders reach by means of the lifting unit the correct assembly position.

In accordance with another advantageous further development of the changing device according to the present invention, the lifting unit includes a support platform for a screw cylinder. This support platform has engagement openings for alignment and coupling pins provided on the screw cylinders. The support platform also includes a coupling device for fixing the alignment and coupling pins.

For achieving a fully automatic exchange of the screw cylinders in the injection molding machine, it is important that the storage unit includes coupling means for the supply of heating energy to each screw cylinder and coupling means for the supply of cooling energy to each cooling block. In this manner, it can be ensured that during the entire waiting time of a screw cylinder and the corresponding cooling block located in a waiting position, an exact predetermination of the necessary operating temperature is possible. Immediately after the changing procedure has been carried out, the screw cylinder has the required operating temperature at all locations thereof, so that the further operation of the injection molding machine can be carried out without any interruption.

In accordance with another feature of the present invention, fitting guide members which are in positive engagement are provided in the free space or alignment seat and on the cooling block of the screw cylinder. These fitting guide members extend transversely of the longitudinal axis of the screw cylinder and include additional locking elements.

The fitting guide members serve to guide the screw cylinders correctly out of and into the operationally required exact assembly position. The locking elements secure the screw cylinders when they are in the assembled position.

It is sufficient for a problem-free operation of the injection molding machine to provide the fitting guide members and the locking elements only on one side in the region of the free space or alignment seat.

In accordance with an advantageous feature of the present invention, the locking elements are a groove of approximately T-shaped cross-section of the cooling block which is engaged by a bolt which is transversely movably guided on a hydraulic cylinder. Underneath its head, the bolt may have a shoulder which serves as a locking member and engages in a corresponding widening portion of the T-shaped groove in the cooling block.

In accordance with another feature, the head bolt is biased by means of spring elements in tightening direction and is acted upon in release direction by a pressure medium cylinder. This feature provides the advantage that the locking elements always automatically reach a locking engagement and are held in this engagement by means of the spring elements. Accordingly, a pressure loss at the pressure medium cylinder will not lead to an undesired separation of the screw cylinder from its assembled position in the injectio molding machine.

The rearward end of the screw shaft of the screw cylinder can be placed in releasable drive connection with the shaft of the drive unit by means of drive claws having, for example, a T-shape or C-shape, which drive claws can be moved transversely of the longitudinal axis of the drive unit in and out of coupling engagement. In this situation, a feature of the present invention provides that the drive claw of the shaft of the drive unit is arrestable and/or fixable relative to the housing of the drive unit and the drive claw of the screw shaft is arrestable and/or fixable relative to the screw cylinder in a predetermined position of rotation facing the free space or alignment seat.

These features ensure that, without any additional manipulations, the coupling connection of the screw shaft with the drive unit can be released and reengaged without problems by the assembly or disassembly procedure of the respective screw cylinder.

The position of rotation of the shaft of the drive unit can be fixed by electrically scanning and decelerating the shaft. Between the screw shaft and the screw cylinder, a mechanical catch coupling is provided which is spring-biased in locking direction. This catch coupling is disengaged against the force of the spring when the screw cylinder is fixed and/or locked in the free space or the alignment seat.

The catch coupling may be a catch bolt which is guided on the screw cylinder so as to be movable transversely of the longitudinal axis of the screw cylinder and is pretensioned by means of spring elements toward the longitudinal axis, wherein the catch bolt engages into a corresponding radial bore in the screw shaft. The catch bolt is displaceable from the radial bore by means of a displacement stop in the free space or alignment seat for the screw cylinder as soon as the screw cylinder has traveled into the free space or alignment seat between the two hydraulic cylinders.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DETAILED DESCRIPTION OF THE INVENTION

Figure 1:
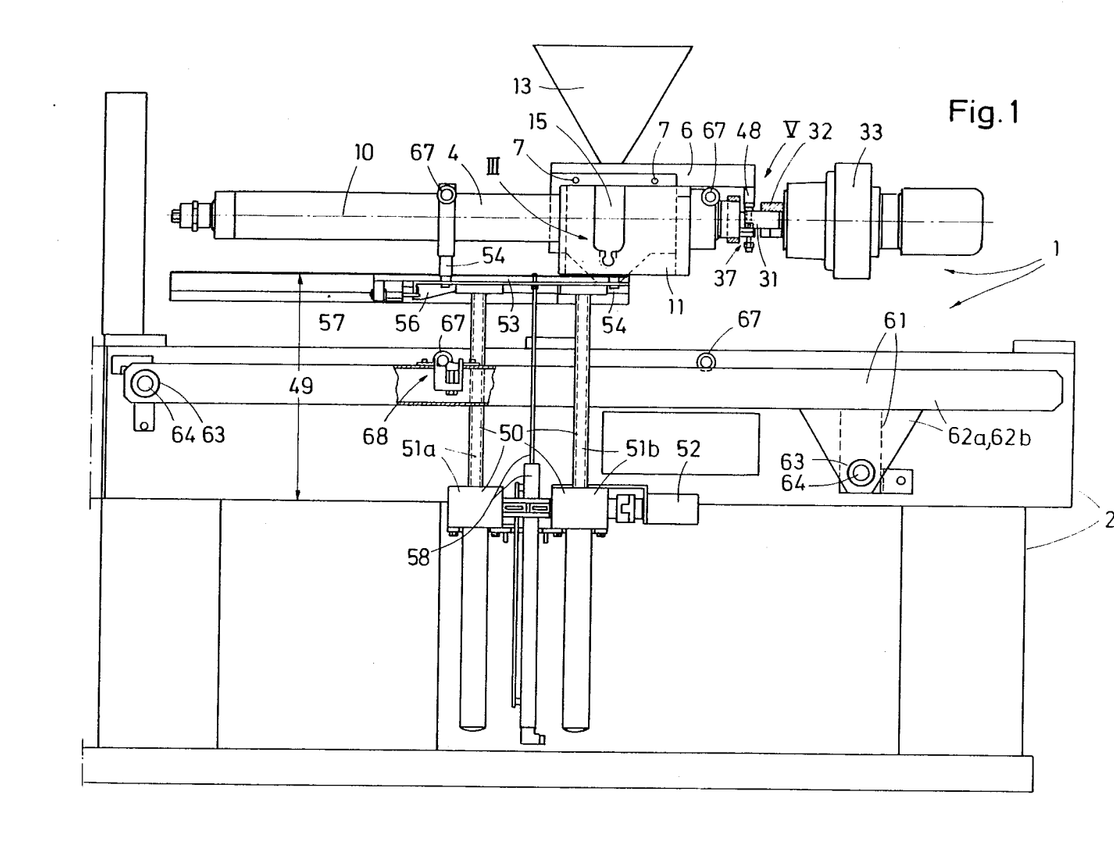
FIG. 1 is a schematic side elevational view of the basic structure of an injection molding machine.
Figure 2:
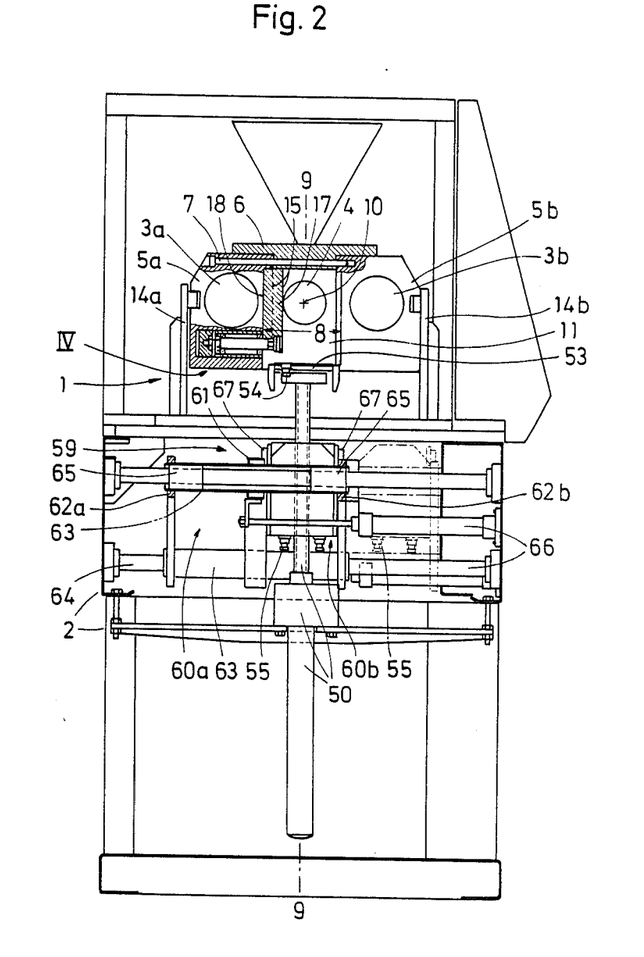
FIG. 2 is a side view, partially in section, of the injection molding machine of FIG. 1.

An injection molding machine 1 illustrated in FIGS. 1 and 2 includes a base frame 2 which supports two hydraulic cylinders 3a and 3b and a screw cylinder mounted between the hydraulic cylinders 3a and 3b.

Each of the two hydraulic cylinders 3a and 3b is received in a frame body 5a and 5b, respectively. The two frame bodies 5a and 5b are connected to each other by means of a transverse member and screws 7 in order to maintain a lateral spacing 8.

The two hydraulic cylinders 3a and 3b are arranged by means of the frame bodies 5a and 5b symmetrically relative to the vertical longitudinal center plane 9—9 of injection molding machine 1, while screw cylinder 4 is located with its longitudinal axis 10 on this longitudinal center plane 9—9.

The rearward end of the screw cylinder 4 is received in a cooling block 11 which surrounds the region of the so-called intake zone of the screw cylinder 4 in which material is supplied into the screw cylinder 4 through, for example, feed hopper 13.

For this purpose, in the illustrated embodiment, feed hopper 13 is mounted on a transverse member 6 which connects the two frame bodies 5a and 5b in which the two hydraulic cylinders 3a and 3b are received on both sides of the screw cylinder 4.

Since transverse member 6 forms the support member for the feed hopper 13, transverse member 6 connects the two frame bodies 5a and 5b at the upper ends thereof, so that the spacing range 8 between the two frame bodies 5a and 5b remains open toward the rear, toward the front or toward the bottom, while it is closed toward the top by the transverse member 6.

The structural component formed by the two frame bodies 5a and 5b and the transverse member rests in two support stands 14a and 14b which, in turn, rest on the base frame 2 of injection molding machine 1. Support stands 14a and 14b are located on the longitudinal sides of the frame bodies 5a and 5b which face away from each other and are in connection with the frame bodies 5a and 5b by means of interengaging longitudinal guide elements. Accordingly, the support stands 14a and 14b indirectly also support and horizontally align the two hydraulic cylinders 3a and 3b.

The cooling block 11 defines in one of its longitudinal side surfaces a fitting groove 15 which extends essentially perpendicularly to the longitudinal axis 10 of the screw cylinder 4 and at its lower end leads into a more narrow groove 16 having an approximately T-shaped undercut cross-section. The fitting groove 15 and the downwardly adjacent groove 16 having the T-shaped undercut cross-section are illustrated more clearly in FIGS. 3 and 4 than in FIGS. 1 and 2 of the drawing.

Figure 3:
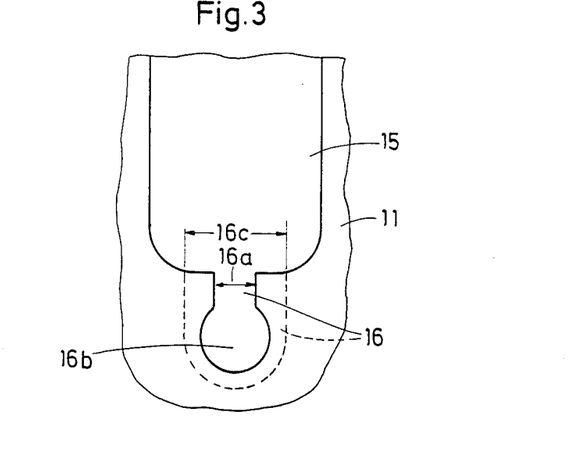
FIG. 3 is a partial view, on a larger scale, of the area denoted by III in FIG. 1.
Figure 4:
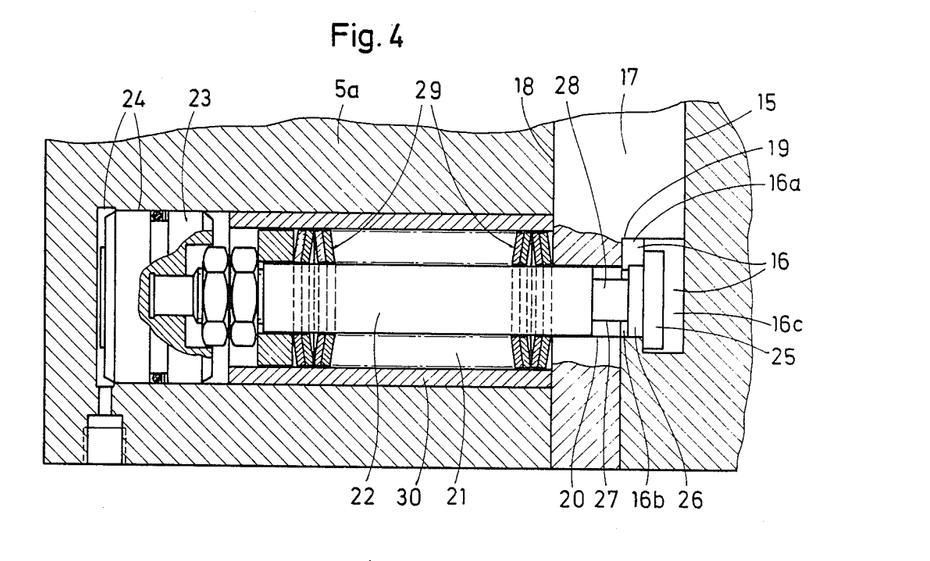
FIG. 4 is a partial view, on a larger scale, of the area denoted by IV in FIG. 2.

A fitting wedge 17 is assigned to fitting groove 15. Over a portion of its thickness, fitting wedge 17 is received in a groove 18 which is located in the inner side surface of the frame body 5a and extends almost along the entire height of frame body 5a up to the underside of cross-member 6.

At the point where fitting groove 15 becomes the more narrow groove 16 having the T-shaped undercut, fitting wedge 17 has a stepped portion 19, so that the fitting wedge 17 has over the length of the groove 16 down to the lower end of the frame body 5a only a thickness which corresponds to the depth of the groove 18 in the frame body 5a.

The slot-like open narrow portion 16a of the T-shaped undercut groove 16 leads at its lower end into a circular widened portion 16b.

Underneath stepped portion 19, fitting wedge 17 has a throughhole 20 which is in axial alignment with a cylindrical recess 21 in frame body 5a. A bolt 22 is coaxially slidably guided in cylindrical recess 21 and through hole 20. At its rearward end, the bolt 22 has a piston 23 which is slidably guided to a limited extent within a cylindrical space 24. At the end opposite piston 23 which extends through throughhole 10 of fitting wedge 17, bolt 22 has first a flat head portion 25 with increased diameter. Adjacent part 25 is a shoulder 26 of a diameter which corresponds to that of bolt 22. Next to shoulder 26 is a reduced diameter area 27 in which the bolt has a shaft portion 28 whose diameter is smaller than that of the bolt 22.

A stack of cup springs or plate springs 29 is assigned to the bolt 22 in the cylindrical recess 21. The stack of springs 29 is surrounded by a sleeve 30. The stack of springs 29 rests, on the one side, against the backside of the fitting wedge 17 and, on the other side, acts on the end of the bolt 22 with the piston, so that bolt 22 is biased to be pulled into the cylindrical recess 21.

However, the bolt 22 can be moved against the force of the stack of springs 29 in the direction out of the cylindrical recess 21 by having a pressure medium, for example, hydraulic liquid, act on the piston 23 within the cylindrical space 24.

The spacing region 8 between the two frame bodies 5a and 5b serving as the support of the hydraulic cylinders 3a and 3b forms a free space or alignment seat for the cooling block 11 which surrounds the rearward end of the screw cylinders 4. The screw cylinder 4 including cooling block 11 is moved upwardly from below into the spacing region 8 until contact is made with the transverse member 6. During this movement, the fitting wedge 17 of frame body 5a becomes engaged with the fitting groove 15 in cooling block 11 and, thus, ensures a support without tilting of cooling block 11 and of the screw cylinder 4 within the free space or alignment seat.

For moving the cooling block 11 upwardly until it makes contact with the transverse member 6, a pressure medium, for example, pressurized liquid, must be admitted to the piston 23 connected at its rearward end to bolt 22 in cylinder 24. This pressure medium must overcome the action of the stack of springs 29 in order to push the head part 25 until it reaches the bottom of the fitting groove 15 in cooling block 11. Head part 25 and shoulder part 26 of bolt 22 are then located in a region of the fitting groove 15 in which the wide portion 16c of the T-shaped undercut groove 16 is located. The reduced diameter shaft portion 28 of bolt 22 is now in a position which corresponds to the more narrow portion 16a of the T-shaped undercut groove 16.

Thus, when the cooling block 11 containing the screw cylinder 4 is moved upwardly against the transverse member 6, the bolt 22 including head part 22, shoulder 26 and shaft portion 28 can engage into the T-shaped undercut groove 16 of the cooling block 11 in such a way that the axis of the bolt coincides with the axis of the circular widened portion 16b. When the pressure acting on the piston 23 in the cylinder space 24 is removed, the stack of springs 29 becomes untensioned. As a result, shoulder 26 of the bolt engages into the circular widened portion 16b of the T-shaped undercut groove 16 and, thus, a positive locking of the cooling block 11 in the spacing region 8 is effected between the two frame bodies 5a and 5b. Accordingly, screw cylinder 4 is securely fixed by means of cooling block 11 within the free space or alignment seat formed by the two frame bodies 5a and 5b and the upper transverse member 6.

In the above-described correct position of assembly of the cooling block 7 and, thus, of the screw cylinder 4, it is important that the screw shaft 31 of the screw, not shown, which is rotatably mounted in screw cylinder 4 is correctly coupled to the drive shaft 32 of the drive unit 33 which is also mounted on the base frame 2 of injection molding machine 1.

Figure 5:
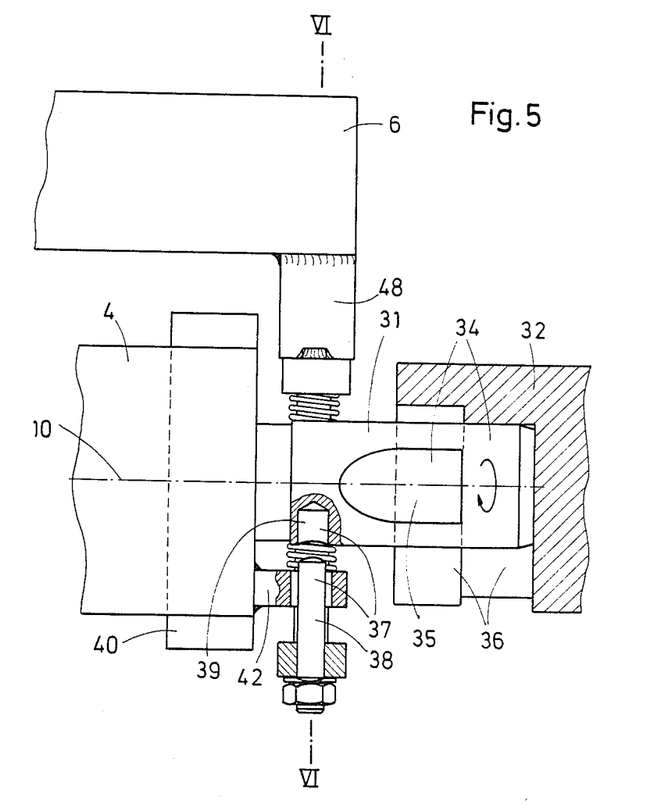
FIG. 5 is a partial view, on a larger scale, of the area denoted by V in FIG. 1.

To make this possible, screw shaft 31 has at its rearward end an approximately T-shaped section 34. This section may be formed in the simplest case by cutting away two segment-like circumferential portions at two diametrically oppositely located circumferential surfaces of the screw shaft 31 and to flatten the surfaces at these locations.

On the other hand, drive shaft 32 of drive unit 33 is provided at its free end with unilaterally radially open cutouts 36, so that an essentially C-shaped engagement section is provided which is shaped complementary to the T-shaped coupling section 34 at the screw shaft 31.

The coupling section 34 and the cutouts 36 can only be engaged and disengaged by a displacement of the screw cylinder 4 transversely of its longitudinal axis 10 relative to the drive unit 33. In other words, this disengagement is effected by a displacement movement as it must be carried out for the assembly and disassembly of the screw cylinder 4 including the cooling block 11 in the spacing region 8 between the two frame bodies 5a and 5b.

It is required in this connection that the T-shaped coupling section 34 of the screw shaft 31 and the radially open side of the cutouts 36 in the drive shaft 32 of the drive unit 33 assume an exactly downwardly aligned position as it is illustrated in FIG. 5 of the drawing.

To ensure that this correct aligned position of the coupling members 34 and 36 is reached during each standstill of the screw shaft 31 and the drive unit 33, the drive unit 33 includes an electrical scanning means with deceleration control which serves to bring to a standstill the drive shaft 32 always in a certain angular position relative to the housing of the drive unit 33.

A mechanical catch coupling 37 is used for obtaining the correct angular position or positions of rotation of the screw shaft 31 relative to the screw cylinder 4.

Figure 6:
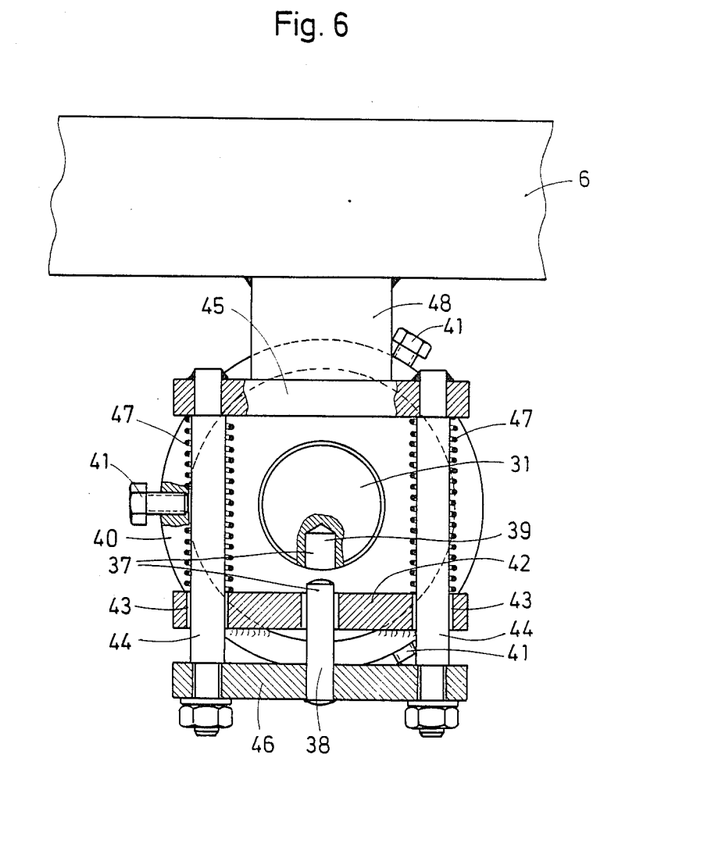
FIG. 6 is a sectional view taken through the arrangement of FIG. 5 along sectional line VI—VI.

This mechanical catch coupling 37 includes a catch bolt 38 which is guided on screw cylinder 4 so as to be movable in the direction of its longitudinal axis and is spring biased radially in the direction toward the longitudinal axis 10 of the screw cylinder 4. Coupling 37 further includes a radial catch bore 39 in the screw shaft 31, as illustrated in FIGS. 5 and 6.

An annular member 40 is fixed on the circumference of the screw cylinder 4 by means of several, for example, three, clamping screws 41. To this annular member 4 is attached a bridge member 42 in such a way that bridge member 42 is located on a secant of annular member 40. Near both ends of the bridge member 42 are provided throughbores 43 which each receive a bolt 44. Both bolts 44 are fixedly connected to each other at their upper ends as well as at their lower ends by means of a transverse plate 45 and 46, respectively, wherein the lower transverse plate 46 supports the catch bolt 38. In addition, each bolt 44 is surrounded by a compression spring 47 which rests with its lower end on the bridge member 42 and acts with its upper end on the transverse plate 45 and is biased to push the transverse plate 45 upwardly to such an extent that the lower transverse plate 46 makes contact with the underside of the bridge member 42. Always when lower transverse plate 46 and bridge member 42 make contact, catch bolt 38 engages in catch bore 39 of screw shaft 31 and, thus, secures screw shaft 31 against an unintentional rotation relative to screw cylinder 4. This is applicable when the screw cylinder 4 is not mounted in the injection molding machine 1 or when screw cylinder 4 is lowered together with the cooling block from the assembled position shown in FIGS. 1 and 2 within the spacing region 8 relative to transverse member 6.

However, to make possible an automatic disengagement of the catch coupling 37 when the screw cylinder reaches its correct assembled position in the injection molding machine 1, a stop block 48 is arranged at the rearward end of the transverse member 6 at the underside thereof, wherein the upper transverse plate 45 runs up against this stop lock 48. As a result, upper transverse plate 45 is moved against the force of the two compression springs 47 under guidance of the bolts 44 downwardly relative to bridge member 42, so that transverse plate 46 including catch bolt 38 also moves downwardly away from bridge member 42 and the catch bolt 38 moves out of catch bore 39 in screw shaft 31, as illustrated in FIGS. 5 and 6 of the drawing.

As is clear from the above, the assembly and disassembly of the screw cylinder 4 including the cooling block 11 surrounding the screw cylinder 4 is carried out in a particularly advantageous manner from below. Therefore, an open space 49 is provided in the base frame 2 of injection molding machine 1 underneath the hydraulic cylinders 3a and 3b and the screw cylinder 4. For carrying out the exchange procedure, the screw cylinder 4 and the cooling block 11 can be moved into this open space 49.

The free height of this open space 49 corresponds to at least the greatest structural height of a screw cylinder 4 combined with a cooling block 11. Preferably, the free height of open space 49 is substantially greater than this maximum structural height.

A lifting unit 50 is used for raising and lowering the screw cylinder 4 including the cooling block 11. Lifting unit 50 is integrated in the base frame 2 of injection molding machine 1. In the illustrated embodiment, this lifting unit 50 uses two parallel lifting spindle units 51a and 51b which have a common drive motor 52 and, thus, operate synchronously. Both lifting spindle units 51a and 51b have a common support platform 53 which can receive a screw cylinder 4 with a cooling block 11, so that the screw cylinder 4 can be moved upwardly from below into the correct assembled position, or can be lowered from the top from the correct assembled position.

In order to secure the screw cylinder 4 and the cooling block 11 in their positions on the support platform 53 during the lifting and/or lowering procedure, screw cylinder 4 and cooling block 11 have downwardly projecting alignment and coupling pins 54 which can engage into corresponding engagement openings in the support platform 53. The alignment and coupling pins 54 have reduced diameter portions 55 which are engaged by locking slides 56 which are movable laterally by means of an adjustment drive 57, for example, a pressure medium cylinder.

The adjustment drive 67 for the locking slides 56 can be controlled in such a way that a disengagement of the locking slides 56 takes place only when the lifting unit 50 has reached its upper or lower end position. For controlling the adjustment drive 57 for the locking slides 56, a measuring system 58 may be used which is assigned to the lifting unit 50 in the base frame 2 of the injection molding machine 1.

Another development of the changing device for the screw cylinder 4 of the injection molding machine 1 is illustrated particularly in FIG. 2. In this changing device, a storage unit 59 is provided within the open space 49 above base frame 2. Storage unit 59 has storage positions 60a and 60b arranged next to each other for at least two screw cylinders 4 with corresponding cooling blocks 11. Storage unit 59 is constructed in such a way that storage positions 60a and 60b can be moved alternatingly into the range of operation of the lifting unit 50 and underneath the free space or alignment seat in the spacing region 8 between the frame bodies 5a and 5b. As shown in FIG. 2, storage position 60b of the storage unit 59 is in the range of operation of the lifting unit 50.

Storage unit 59 has a longitudinal middle support member 61 and two longitudinal side members arranged on opposite sides and spaced apart from middle support member 61. Longitudinal side members 62a and 62b are connected to each other and to the middle support member 61 by means of transverse pipes 63. Extending concentrically through each of these transverse pipes 63 is a cross-beam 64 which is rigidly mounted in the base frame 2 and extends over the entire width thereof. Each transverse pipe 63 is mounted on its cross-beam 64 so as to be movable to a limited extent through guide bushings 65. The drive is effected by means of a pressure medium cylinder 66 whose piston rod acts on the middle support member 61.

Storage position 60a is provided between the middle support member 61 and the left longitudinal side member 62a, while the storage position 60b is provided between the middle support member 61 and the right longitudinal side member 62b.

To ensure that each screw cylinder 4 together with the corresponding cooling block 11 can be securely placed in the storage positions 60a and 60b of the storage unit 59, screw cylinder 4 has laterally cantilevering support members, for example, rollers 67. As indicated in FIGS. 1 and 2, these rollers 67 rest on the one side on the middle support member 61 and on the opposite side either on the longitudinal side member 62a or on the longitudinal side member 62b.

As FIG. 1 further shows, the middle support member 61 as well as the two longitudinal side members 62a and 62b extend almost over the entire length of the base frame 2 of the injection molding machine 1. Accordingly, members 61, 62a and 62b make it possible to slide the screw cylinders 4 with the corresponding cooling blocks 11 from the end faces of the injection molding machine 1 into the storage unit 59 or its storage positions 60a and 60b.

FIG. 1 of the drawing shows a construction in which the screw cylinders 4 including cooling blocks 11 are moved in and out from the right end face of the injection molding machine. The correct positioning of the screw cylinders 4 and cooling blocks 11 in longitudinal direction of the storage unit 5 or the storage positions 60a and 60b is fixed by means of locking devices 68 which may be operatively connected to, for example, rollers 67, as indicated in FIG. 1.

This exact longitudinal positioning of the screw cylinders 4 and cooling blocks 11 within the storage unit 59 or its storage positions 60a and 60b is not only necessary for carrying out a correct and secure changing procedure within the spacing region 8 between the frame bodies 5a and 5b of the two hydraulic cylinders 3a and 3b, but is also particularly advantageous if the screw cylinders 4 and cooling blocks 11 are to be connected to heating energy supplies or cooling energy supplies when the screw cylinders 4 and cooling blocks 11 are in the storage positions 60a and 60b. This ensures that the respective screw cylinder 4 and cooling block 11 already have during the carrying out of the changing procedure the operating temperature required for the injection procedure.

While a specific embodiment of the invention has been shown and described in detail to illustrate the application of the inventive principles, it will be understood that the ( invention may be embodied otherwise without departing from such principles.

We claim:

1. In a changing device for the screw cylinder of an injection molding machine, wherein the screw cylinder has forward and rearward ends includes a screw which is in releasable coupling connection with a drive unit of the machine, the screw cylinder including the screw being displaceable relative to the injection molding machine essentially transversely of the longidudinal direction of the screw cylinder for releasing and uncoupling the coupling connection, two hydraulic cylinders arranged spaced apart symmetrically and parallel to the longitudinal center plane of the injection molding machine, the two cylinders having upper longitudinal sides and being connected to each other by means of a transverse member, a free space extending forwardly from the drive unit toward the forward end of the screw cylinder being defined by the two hydraulic cylinders and the transverse member, the free space forming an alignment seat which is open towards the front and the back and a longitudinal side, the screw cylinder being fixable and lockable in the coupled position to the drive unit in the alignment seat, the improvement which comprises the free space forming the alignment seat of the changing device being open toward the bottom, so that the transverse member which connects the hydraulic cylinders is capable of acting on the upper longitudinal side of the hydraulic cylinders.

2. The changing device according to claim 1 the further improvement, wherein the rearward end of the screw cylinder is surrounded by a cooling block which has a prismatic peripheral shape which is adapted to the free space.

3. The changing device according to claim 2 the further improvement, wherein the injection molding machine includes a base frame, the base frame defining an open space underneath the hydraulic cylinders and the screw cylinder, the free height of the open space corresponding at least to the greatest structural height of a screw cylinder combined with a cooling block, a lifting unit being mounted in the base frame for vertically moving each screw cylinder including cooling block between the open space and the free space within the injection molding machine.

4. The changing device according to claim 3 the further improvement wherein a storage unit is mounted in the open space above the base frame, the storage unit having at least two storage positions arranged next to each other for supporting two screw cylinders including cooling blocks, the two storage positions being movable alternatingly into the range of operation of the lifting unit and underneath the free space.

5. The changing device according to claim 4, wherein the storage unit includes a longitudinal middle support member and two longitudinal side members and transverse pipes which connect the middle support member and two side members at a predetermined distance with each other, the transverse pipes being movably mounted by means of guide bushings on cross-beams supported by the base frame, the storage unit being movable transversely in the base frame between two end positions by means of pressure medium cylinders.

6. The changing device according to claim 5 the further improvement, wherein each screw cylinder is placeable by means of lateral support members on the middle support member and one of the side members and is movable in longitudinal direction on the middle support member and the side member, the screw cylinders being fixable in a predetermined longitudinal position relative to the middle support member and to the side members, so that the screw cylinders can reach by means of the lifting unit the correc assembly position.

7. The changing device according to claim 6, wherein the lateral support members are rollers.

8. The changing device according to claim 6, wherein the lifting unit includes a support platform for the screw cylinder, the support platform having engagement openings for alignment and coupling pins provided on the screw cylinders, the support platform further including a coupling device for fixing the alignment and coupling pins.

9. The changing device according to claim 8, wherein the storage unit includes coupling means for the supply of heating energy to the screw cylinder and coupling means for the supply of cooling energy to the cooling block.

10. The changing device according to claim 9, wherein fitting guide members which are in positive engagement with each other are provided in the free space and on the cooling block of the screw cylinder, the fitting guide members extending transversely of the longitudinal axis of the screw cylinder and including additional locking elements.

11. The changing device according to claim 10, wherein the fitting guide members and the locking elements are located on one side in the region of the free space.

12. The changing device according to claim 10, wherein the locking elements are a groove of approximately T-shaped cross-section defined in the cooling block and a bolt which is transversely movably guided on one of the hydraulic cylinders, the groove being engaged by the bolt.

13. The changing device according to claim 12, wherein the bolt has a shoulder which serves as a locking member and engages in a corresponding widening portion of the T-shaped groove in the cooling block.

14. The changing device according to claim 13, wherein the bolt is biased by means of spring elements in the tightening direction and is acted upon in release direction by a pressure medium cylinder.

15. The changing device according to claim 14 the further improvement, wherein the rearward end of the screw shaft of the screw cylinder can be placed in releasable drive connection with the shaft of the drive unit by means of drive claws, the drive claws being movable transversely of the longitudinal axis of the drive unit in and out of coupling engagement, the drive claw of the shaft of the drive unit being arrestable and fixable relative to a housing of the drive unit, and the drive claw of the screw shaft being arrestable and fixable relative to the screw cylinder in a predetermined position of rotation facing the free space.

16. The changing device according to claim 15, wherein the drive claws are T-shaped.

17. The changing device according to claim 15, wherein the drive claws are C-shaped.

18. The changing device according to clarm 15 the further improvement, wherein the position of rotation of the shaft of the drive unit is fixable by an electrical scanning means and a shaft decelerating means, a mechanical catch coupling being provided between the screw shaft and the screw cylinder, the mechanical catch coupling being spring-biased in locking direction, the catch coupling being disengaged against the force of the spring when the screw cylinder is fixed and locked in the free space.

19. The changing device according to claim 18, wherein the catch coupling includes a catch bolt guided on the screw cylinder so as to be movable transversely of the longitudinal axis of the screw cylinder and pretensioned by means of spring elements toward the longitudinal axis, wherein the catch bolt engages into a corresponding radial bore defined in the screw shaft, and the catch bolt is displaceable from the radial bore by means of a displacement stop in the free space for the screw cylinder.

* * * * *